United States Patent
Rutzki

[15] 3,682,498
[45] Aug. 8, 1972

[54] SAFETY BELTS

[72] Inventor: nee Wilke Edith Rutzki, Richard-Wagner-Strabe 37, Heidelberg-Dossenheim, Germany

[22] Filed: Sept. 18, 1970

[21] Appl. No.: 73,558

[30] Foreign Application Priority Data

Feb. 21, 1970    Germany..........P 20 08 048.2

[52] U.S. Cl......................280/150 AB, 280/150 SB
[51] Int. Cl.............................................B60r 21/10
[58] Field of Search........280/150 AB; 180/82; 9/316; 297/385–389; 244/122

[56] References Cited

UNITED STATES PATENTS

| | | |
|---|---|---|
| 3,430,097 | 3/1969 | Terry et al.................280/150 |
| 2,868,309 | 1/1959 | Burgess......................180/82 |
| 3,414,326 | 12/1968 | Raffaelli................280/150 X |
| 3,146,460 | 9/1964 | Henderson.............280/150 X |
| 2,993,217 | 7/1961 | Switlik.............................9/316 |
| 3,144,667 | 8/1964 | Dobbs..........................9/316 |
| 3,243,822 | 4/1966 | Lipkin...................280/150 X |
| 3,302,224 | 2/1967 | Boucher........................9/316 |
| 3,526,432 | 9/1970 | Jensen et al...............297/389 |

*Primary Examiner*—Kenneth H. Betts
*Attorney*—Curtis, Morris & Safford

[57] ABSTRACT

A vehicle safety base is provided with an inflatable protective device. Inflation occurs when the safety belt has a tension stress applied to it. The safety belt is constructed in the form of a tube or hose so that its large internal volume can serve for supply of the pressure medium to the protective device.

12 Claims, 7 Drawing Figures

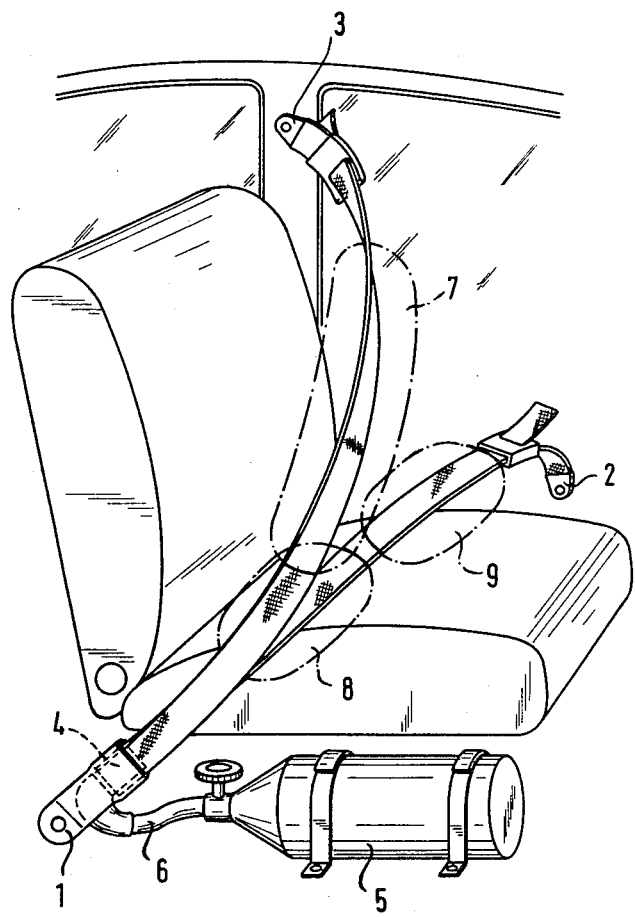

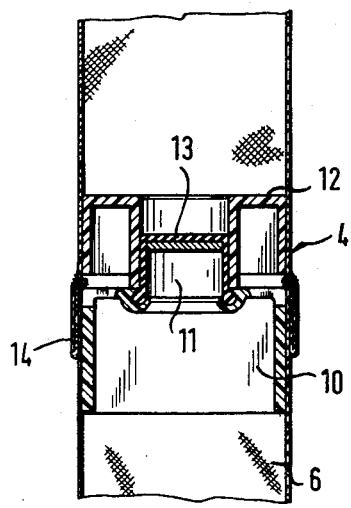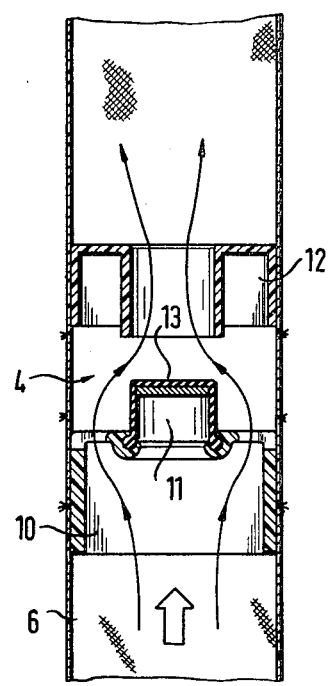

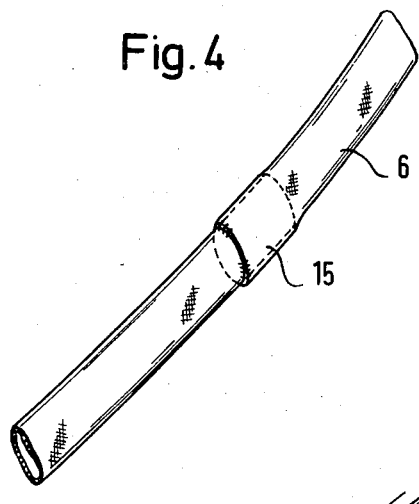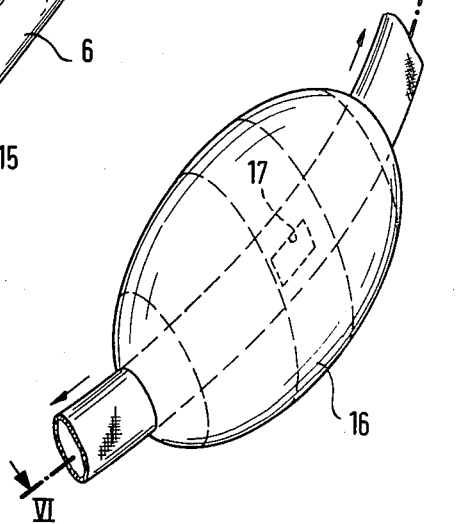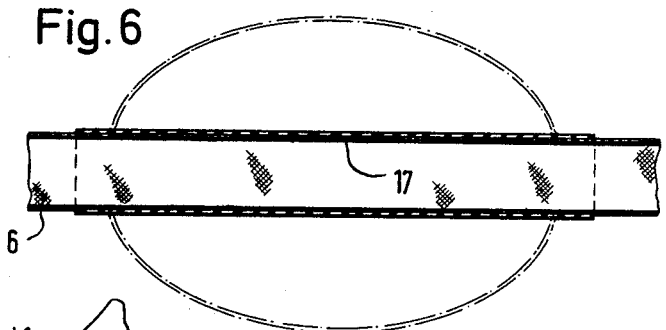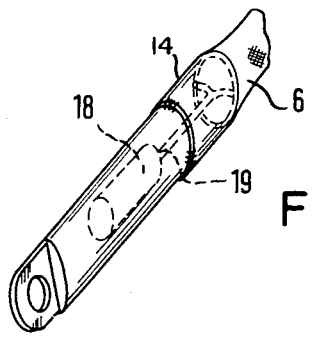

SAFETY BELTS

The present invention relates to safety belts for motor vehicles or aircraft.

Safety belts are normally made of webbing. After a long period of use such webbing tends to roll along its longitudinal axis so that if an accident should occur the body is only held by strips which are only a few centimeters in width. This may cause the safety belt to cut into the body, more particularly in the soft abdominal parts. Furthermore, pressure distribution over the body is very uneven.

When it was seen that safety belts do not retain or catch the body in an accident with even an distribution of pressure and injuries frequently occur, proposals were made in the past for the arrangement of air sacks in or bags the dash-board of cars, and means to provide for inflating these sacks when an accident occurs. Despite the fact that various experiments were carried out in this context, no practical arrangement has yet been arrived at. The release of the pressure medium is to carry out in response to an acceleration or deceleration measuring device. Such a measuring device must response to all forces which act on the vehicle with a certain force, irrespective of the direction in which the forces come. The motor vehicle can crash into another vehicle or a fixed obstacle. Another vehicle may crash into it from behind or from the side; it is also possible for the vehicle to run down a slope for example and fall on its roof. In all these cases the pressure medium must be released. The measuring device which response to all these forces would, however, be actuated on other occasions, for instance when the vehicle passes over a pot-hole. An unintentional actuation of the instrument might, however, give rise to accidents either because the driver becomes alarmed as the air sack or bag is suddenly inflated in front of him, or because he cannot see where he is driving any more.

It is an object of the invention to construct a safety belt in such a manner that the danger of injury on an accident occurring is reduced.

Another object of the invention is to provide an inflatable protective device which is inflated when an excessive tension force acts on the safety belt.

It is another object of the invention to construct a tubular safety belt in such a manner that its whole cross section can be utilized for the supply of a pressure medium to an inflatable protective device, so that inflation of the protective device in an accident occurs very rapidly owing to the large supply or duct cross section available for the pressure medium or fluid.

In accordance with one aspect the present invention provides a safety belt for vehicles and aircraft comprising an inflatable protective device, which is arranged on the safety belt, a pressure medium source, and a connecting device, which is normally closed, between the pressure medium source and the protective device, the connecting means being arranged to be open when an excessive tension load is applied to the safety belt.

In the case of one form of belt in accordance with the invention part of the belt and the protective device arranged on the belt, for example an air sack or bag, a cushion or the like, are capable of being inflated by means of the pressure medium.

In accordance with a preferred embodiment the belt is made up of tubular or hose-like webbing. This makes it possible for the whole cross section or at least the last part of the belt cross section to be acted upon by the pressure medium. Thus, a relatively short inflation time, for example one twenty-fifth of a second or less is achieved. The bags, cushions or sacks arranged on the belt are connected via correspondingly large openings with the interior of the webbing.

In accordance with a preferred form of the invention the belt has a frangible seam in it which is torn open it is placed under load on an accident occurring and thus a valve is opened for the pressure medium. Such a valve can consist of two telescoping flat parts. The flow of pressure medium can, however, be allowed by the tearing or breaking of a supply hose which is normally closed.

In accordance with a further preferred feature of the invention a storage container for the pressure medium, for instance a compressed air bottle, is arranged alongside the driver's seat. The pressure medium can, however, be produced by the ignition of an explosive mixture of chemicals. The mixture of chemicals can for example be in the form of a cartridge which is mounted directly in the safety belt itself.

The construction can also be such that the interior of the belt and/or elastic cushions arranged on the belt can be inflated via an auxiliary valve without actuation in an accident. This inflation is on the one hand for the comfort of the driver since, for example, a rubber cushion abutting against the stomach region and partially inflated feels more comfortable than the pressure of a narrow belt strap or the lock of a safety belt; and on the other hand in the case of an accident the completely inflated condition is achieved more rapidly. It is mentioned in this connection that a partially inflated tubular safety belt with or without corresponding inflated pressure cushions provides substantially better protection in the case of an accident than a strap-like belt, even if complete inflation is not achieved owing to one reason or another.

In accordance with one embodiment of the invention a folded sack is attached to the safety belt which is unfolded when the pressure medium is supplied and becomes inflated. At the position at which the sack is attached the belt can have a frangible fold. When on the occurrence of an accident the safety belt is subjected to a corresponding tension force by the body, the fold is torn open so that the unfolding of the sack is promoted.

The best protection in accidents in accordance with known arrangements is achieved by so-called three-point belts, which include both a shoulder belt and also a stomach belt. In accordance with the present invention both belt parts can be provided with inflatable sacks, cushions or bags.

When the belt in accordance with the invention has a breadth of 8 cm, preferably over 12 cm, it forms on inflation a hose whose diameter is also 8 cm or 12 cm respectively. It is found that such a hose can substantially cut out the impact of the body against the steering wheel or the dash-board. Such a large diameter also ensures reliably that the body is not cut by the belt. Since the pressure inside the hose is equalized by the pressure medium, there is also a guarantee that a larger body surface is acted upon, with a correspondingly smaller pressure, than is the case with conventional strap-like safety belts.

The accompanying drawings show preferred embodiments of the subject matter of the invention.

FIG. 1 is a perspective view of a car seat with a safety belt in accordance with the invention.

FIG. 2 is a section of the valve position when the valve is closed.

FIG. 3 is a section corresponding to FIG. 2 with the valve opened.

FIG. 4 is a perspective view of a belt part with an inflatable sack.

FIG. 5 is a perspective view of a belt part with an inflatable cushion.

FIG. 6 is a section along the line VI—VI in FIG. 5.

FIG. 7 shows diagrammatically a cartridge accommodated in the safety belt for producing the pressure medium.

In accordance with the invention safety belts of the most various different shapes and constructions can be provided which are capable of being inflated or are provided with inflatable parts. FIG. 1 shows a belt with a three-point attachment, which has three fittings 1, 2 and 3, by means of which the belt is attached to the vehicle at conventional positions. The belt is so made of tubular webbing, that the stomach belt extending from the fitting 1 to the fitting 2 and the shoulder belt extending from the fitting to the fitting 3 are connected at a valve position 4. The inner space extending along inside the straps or belts and the valve position form a connecting device or means which in the normal non-actuated condition is closed. On opening the valve 4 a pressure medium source, arranged between the two front seats, for example in the form of a compressed air bottle 5, a supply tube 6, the shoulder belt and also the stomach belt are inflated. On the shoulder belt and on the stomach belt inflatable protective devices such as sacks and cushions 7, 8 and 9 are arranged, which communicate via suitable openings with the interior of the belt and which on inflation of the hose are also inflated. The arrangement of the air sacks or cushions can be varied in accordance with conditions in the vehicle and the personal wishes of the occupant in a large number of different ways.

An example of the valve position 4 is shown in FIGS. 2 and 3. The supply hose 6 is connected with a flat piece 10 which has a projection 11. The projection 11 is inserted into a corresponding part 12 and has a rubber membrane seal 13. The webbing of the belt has a fold 14 at the valve position, which is sewn up. The flat parts 10 and 12 are connected with the webbing of the belt, for example by adhesive. For this reason the flat part 11 cannot readily be drawn out of the flat part 12. The pressure obtaining in the supply hose 6 instead causes the rubber member 13 to be sealed. When, however, an accident occurs, the resulting strain on the belt causes a tension exceeding a certain magnitude to be applied to the belt so that the fold 14 is torn open and correspondingly the flat part 11 is drawn out of the flat part 12. For the pressure medium a passage opening with a large cross section is therefore made available. The medium flows through the interior of the hose-like material or webbing of the belt to the air sacks or cushions 7, 8, 9 and inflates them.

The valve arrangement 4 can be simplified. The supply hose 6 can for example be in the form of a plastic hose or flexible tube, which is closed at its end by adhesive. At the level of the seam 14 there is therefore a preferred breakage position of the hose, which is also torn open when the fold 14 is torn open. The construction of the valve arrangement 4 can also be made in such a manner that when an accident occurs, a certain permitted time for inflation is not exceeded.

In cases in which an air sack is arranged, for example on the shoulder strap or belt, the sack should have such a size that it also serves to protect the face of the driver. However, to ensure that the driver is still able to see after actuation, the sack should be made of a material which is as transparent as possible. The air sack is in this case folded in an outward direction somewhat like a parachute and, as shown in FIG. 4, arranged along the belt. In order to ensure that the air sack does not inflate of its own accord, it can be attached to the belt by means such as adhesive. In order to facilitate unfolding, a fold 15 can be provided adjacent to the air sack which is sewn in and is torn open when an accident occurs. The arrangement in relation to the fold 14 can be such in this respect that the last-mentioned fold is torn open by a small load, while the freeing of the opening to the air sack and the unfolding of the latter only occurs when the maximum tension force is achieved. The preceding inflation of the safety belt thus provides a supply duct with a maximum cross section for the supply of air to the air sack. It is, however, ensured that the air sack is inflated even in the case of a small load, that is to say when it is not absolutely essential.

FIG. 5 shows a rubber cushion 16 which is constructed in the form of a hose or cylinder and at its end opening is provided with tubular webbing of the safety belt. The rubber cushion provided for example on the stomach strap is inflated via an opening 17 when loading due an accident is applied. It is naturally also possible to inflate the rubber cushion partially, for example be means of an inflation ball which is squeezed in the hand, or by means of an auxiliary line leading from the compressed gas bottle 5.

In accordance with the construction shown in FIG. 7 a cartridge 18 is provided in the belt, which is filled with a gas-producing chemical mixture. When a high tension load is applied to the belt, the chemical mixture is ignited or detonated by an ignition or detonating device 19 so that the interior of the tubular belt is inflated, together with any air sacks or cushions arranged on the belt.

Instead of the folds 14, 15, which are torn open when a certain tension load occurs, it is also naturally possible to provide other devices for initiating the inflation or unfolding procedure.

What I claim is

1. A safety belt for vehicles and aircraft comprising, a belt having an inflatable portion therein, a pressure medium source, control means for selectively releasing pressure from said source into said belt and means for actuating said control means including means for maintaining a fold in said belt and for releasing said fold when a predetermined tension is applied to said belt, said control means being operatively connected to said belt to release air from said source when said fold is released.

2. A safety belt in accordance with claim 1 wherein said belt is formed of tubular webbing.

3. A safety belt in accordance with claim 1 in which a substantial portion of the cross-section of the tubular belt is arranged to be acted upon by the pressure medium.

4. A safety belt in accordance with claim 1, in which the valve comprises two flat parts telescoped inside each other.

5. A safety belt in accordance with claim 1, in which a storage container for the pressure medium is arranged alongside the seat of the driver in the vehicle.

6. A safety belt in accordance with claim 1, in which said inflatable portion comprises a folded sack attached to said belt, which sack is unfolded on supply of the pressure medium and is inflated.

7. A safety belt in accordance with claim 6, which at a position at which the sack is attached comprises a frangible fold which can be torn open and by tearing open of the fold when an accident occurs unfolding of the sack is promoted.

8. A safety belt in accordance with claim 1, wherein said belt comprises shoulder and stomach belt parts, both of which are provided with communicating inflatable portions.

9. A safety belt in accordance with claim 1 in which said belt has a breadth of over 8 cm.

10. A safety belt as defined in claim 1 wherein said control means comprises a valve having a pair of cooperating telescoping components respectively secured on opposite sides of said fold and moved apart when said fold is released to permit passage of air therethrough.

11. A safety belt as defined in claim 1 wherein said pressure source comprises an explosively burning chemical mixture and said control means comprises a detonator for said mixture operatively connected to said fold for actuation upon release thereof.

12. A safety belt for vehicles and aircraft comprising an inflatable protective device, which is arranged on the safety belt, a pressure medium source and a connecting device, which is normally closed, between the pressure medium source and the protective device, said connecting means being arranged to open when an excessive tension load is applied to the safety belt and includes a valve located between the pressure medium source and the protective device and a frangible fold formed in the belt, which fold is adapted to be torn open when an accident occurs and excessive load is applied to the belt to open the valve to release pressure from the pressure medium into the protective device.

* * * * *